(12) United States Patent
Kawato et al.

(10) Patent No.: US 7,553,893 B2
(45) Date of Patent: Jun. 30, 2009

(54) POLYCARBONATE RESIN COMPOSITION AND OPTICAL PART

(75) Inventors: Hiroshi Kawato, Chiba (JP); Yoshihiko Horio, Chiba (JP); Yasuhiro Ishikawa, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 392 days.

(21) Appl. No.: 10/573,809

(22) PCT Filed: Oct. 5, 2004

(86) PCT No.: PCT/JP2004/014638

§ 371 (c)(1),
(2), (4) Date: Mar. 28, 2006

(87) PCT Pub. No.: WO2005/035659

PCT Pub. Date: Apr. 21, 2005

(65) Prior Publication Data

US 2007/0037906 A1 Feb. 15, 2007

(30) Foreign Application Priority Data

Oct. 7, 2003 (JP) ............................. 2003-347829

(51) Int. Cl.
*C08L 69/00* (2006.01)
*C08K 5/50* (2006.01)

(52) U.S. Cl. ...................... 524/109; 524/114; 524/154; 525/463

(58) Field of Classification Search ........................ None
See application file for complete search history.

(56) References Cited

U.S. PATENT DOCUMENTS

| | | | | |
|---|---|---|---|---|
| 4,092,288 A | * | 5/1978 | Calkins et al. | 524/154 |
| 4,670,479 A | * | 6/1987 | Miyauchi | 524/154 |
| 4,722,955 A | * | 2/1988 | Dick | 524/109 |
| 6,476,178 B1 | | 11/2002 | Mitsuta et al. | |
| 2003/0173546 A1 | * | 9/2003 | Hiroshi et al. | 252/500 |

FOREIGN PATENT DOCUMENTS

| | | | |
|---|---|---|---|
| CA | 2404480 | * | 10/2001 |
| WO | WO 02/16498 | * | 2/2002 |

* cited by examiner

*Primary Examiner*—David Buttner
(74) *Attorney, Agent, or Firm*—Oblon, Spivak, McClelland, Maier & Neustadt, P.C.

(57) ABSTRACT

A polycarbonate resin composition comprising polycarbonate resin (A) and, blended therewith per 100 parts by mass thereof, 0.001 to 0.1 part by mass of arylphosphine (B) and 0.01 to 1.0 part by mass of alicyclic epoxy compound (C); or a polycarbonate resin composition comprising polycarbonate resin (A) and, blended therewith per 100 parts by mass thereof, 0.001 to 0.1 part by mass of arylphosphine (B), 0.01 to 1.0 part by mass of alicyclic epoxy compound (C) and 0.01 to 1.0 part by mass of acrylic resin (D). The polycarbonate resin composition exhibits excellent optical properties, excelling in resistance to high temperature high humidity, resistance to heat aging (especially high temperature aging), heat resistance and impact resistance, and is suitable for production of optical parts, such as a lens of optical semiconductor device mounted on vehicles which can be used even in especially severe environment. There is further provided an optical part molded from the polycarbonate resin composition.

16 Claims, No Drawings

POLYCARBONATE RESIN COMPOSITION AND OPTICAL PART

FIELD OF THE INVENTION

The present invention relates to a polycarbonate type resin composition and an optical part. More specifically, the present invention relates to a polycarbonate type resin composition, which exhibits excellent optical properties as well as excellent resistance to high temperature and high humidity, resistance to heat aging (high temperature aging properties), heat resistance, and impact resistance, and is particularly suitably used for production of optical parts such as a lens of optical semiconductor device mounted on vehicles which can be used even in especially severe environment. There is further provided an optical part molded from the polycarbonate type resin composition.

BACKGROUND ART

In recent years, in view of energy saving and preservation of environment, an optical semiconductor device light source has begun to be installed as a light source for illumination in tail lamps etc. of vehicles.

The optical semiconductor device light source comprises an optical semiconductor device chip, a package that embeds the chip and has light-reflecting properties, an epoxy resin sealant body containing fluorescent material, and an optical lens that is made of transparent resin and covers these aforementioned components.

The optical lens is an optical part that emits light, working as a point light source, by collecting the light emitted from the optical semiconductor device chip and transformed in a layer containing fluorescent material.

It is desirable that the lens of optical semiconductor device mounted on vehicles is made of a material having environment resistance against steam, high temperature aging, etc. and a transparent resin is required, which has high resistance against heat and steam and excellent processability for molding.

As a resin having high heat resistance and high optical transparency a cyclic olefin resin is listed.

While the cyclic olefin resin has a total light transmission as high as 91 to 93% and has an excellent transparency, it has a drawback of limited usage environment since it has poor resistance against high temperature aging.

For example, when a lens of optical semiconductor device mounted on vehicles, which is made of cyclic olefin resin, is used for a backlight illumination device such as a headlight, an instrument panel, a taillight, a winker etc., the lens product shows yellowing in a high-temperature aging-resistance test environment at temperatures of 110 to 140° C. or more, so that cyclic olefin resin cannot be used.

On the other hand, polycarbonate type resin has an excellent resistance in the high-temperature aging-resistance test environment, but its resistance against hydrolysis decreases due to the effect of impurities, antioxidants and the like, so that in automobile use polycarbonate type resin still has a problem of heavy clouding in a pressure cooker test under a saturated steam pressure (for 100 hours at 120 to 127° C.), which is required in a particularly severe exterior use.

In order to solve the problem, compositions prepared by blending special arylphosphine, phosphines and oxetane compounds and/or epoxide compounds with polycarbonate type resin have been proposed, for example in the following referenced patent documents 1 and 2.

However, these polycarbonate type resin compositions still do not have sufficient optical properties.

Referenced patent document 1: Japanese published unexamined application No. H8(1996)-231840.

Referenced patent document 2: Japanese published unexamined application No. H9(1997)-227863.

DISCLOSURE OF THE INVENTION

The present invention provides a polycarbonate type resin composition, which exhibits excellent optical properties (including high total light transmission, etc.), excelling in resistance to high temperature and high humidity, resistance to heat aging (high temperature aging properties), heat resistance, impact resistance etc., and is particularly suitably used for production of optical parts such as a lens of optical semiconductor device mounted on vehicles which can be used even in especially severe environment. There is further provided an optical part molded from the polycarbonate type resin composition.

The present inventors have intensively investigated to solve the above-mentioned problem, and as a result, have found that a polycarbonate type resin composition comprising a polycarbonate type resin, a specific arylphosphine as an anti-oxidation agent and an alicyclic epoxy compound, further in some cases an acrylic type resin and a specific polysiloxane, blended in given amounts can attain the objective of the present invention. Based on this finding, the present invention has been accomplished.

That is, the present invention relates to:

1. A polycarbonate type resin composition comprising polycarbonate type resin (A), 0.001 to 0.1 part by mass of arylphosphine (B), and 0.01 to 1.0 part by mass of an alicyclic epoxy compound (C) per 100 parts by mass of the component (A);

2. A polycarbonate type resin composition comprising polycarbonate type resin (A), 0.001 to 0.1 part by mass of arylphosphine (B), 0.01 to 1.0 part by mass of an alicyclic epoxy compound (C), and 0.01 to 1.0 part by mass of an acrylic type resin (D) per 100 parts by mass of the component (A);

3. A polycarbonate type resin composition described above in 1 or 2, which further contains, 0.01 to 1 part by mass of a polysiloxane compound (E) having at least one kind of groups selected from alkoxy, vinyl, and phenyl groups per 100 parts by mass of the component (A);

4. A polycarbonate type resin composition described above in any of 1 to 3, which further contains, 0.01 to 1 part by mass of a lubricant (F) per 100 parts by mass of the component (A);

5. A polycarbonate type resin composition described above in any of 1 to 4, wherein the component (A) of polycarbonate type resin has a glass transition temperature of 140° C. or more;

6. A polycarbonate type resin composition described above in any of 1 to 5, wherein the component (B) of arylphosphine is triphenylphosphine; and 7. An optical part obtained by molding the polycarbonate type resin composition described above in any of 1 to 6.

DESCRIPTION OF THE PREFERRED EMBODIMENTS

As the polycarbonate type resin used for the component (A) in the polycarbonate type resin composition of the present invention, the one produced by a conventional method, that is, generally by reacting a dihydric phenol and a polycarbonate precursor such as phosgene or carbonate ester compound is listed.

Specifically, for example, the polycarbonate type resin is produced by reacting, in a solvent such as methylene chloride and in the presence of a publicly known acid acceptor or molecular weight modifier, further, if necessary with addition of a branching agent, a dihydric phenol and a polycarbonate precursor such as phosgene, or by transesterification between a dihydric phenol and a carbonate precursor such as diphenylcarbonate.

As the dihydric phenol used, various kinds of phenols are cited, and particularly 2,2-bis(4-hydroxyphenyl)propane (commonly called as bisphenol A) is preferable.

Examples of bisphenol other than bisphenol A include bis(hydroxyaryl)alkanes such as bis(4-hydroxyphenyl)methane; 1,1-bis(4-hydroxyphenyl)ethane; 2,2-bis(4-hydroxyphenyl)butane; 2,2-bis(4-hydroxyphenyl)octane; 2,2-bis(hydroxyphenyl)phenylmethane; 2,2-bis(4-hydroxy-3-methylphenyl)propane; bis(4-hydroxyphenyl)naphthylmethane; 1,1-bis(4-hydroxy-t-butylphenyl)propane; 2,2-bis(4-hydroxy-3-bromophenyl)propane; 2,2-bis(4-hydroxy-3,5-tetramethylphenyl)propane; 2,2-bis(4-hydroxy-3-chlorophenyl)propane; 2,2-bis(4-hydroxy-3,5-tetrachlorophenyl)propane; 2,2-bis(4-hydroxy-3,5-tetrabromophenyl)propane and the like, bis(hydroxyaryl)cycloalkanes such as 1,1-bis(4-hydroxyphenyl)cyclopentane; 1,1-bis(4-hydroxyphenyl)cyclohexane; 1,1-bis(4-hydroxyphenyl)-3,5,5-trimethylcyclohexane; 2,2'-bis(4-hydroxyphenyl)norbornene and the like, dihydroxyarylethers such as 4,4'-dihydroxyphenylether; 4,4'-dihydroxy-3,3'-dimethylphenylether and the like, dihydroxydiarylsulfides such as 4,4'-dihydroxydiphenylsulfide; 4,4'-dihydroxy-3,3'-dimethyldiphenylsulfide and the like, dihydroxydiarylsulfoxides such as 4,4'-dihydroxydiphenylsulfoxide; 4,4'-dihydroxy-3,3'-dimethyldiphenylsulfoxide and the like, dihydroxydiarylsulfones such as 4,4'-dihydroxydiphenylsulfone; 4,4'-dihydroxy-3,3'-dimethyldiphenylsulfone and the like, dihydroxydiphenyls such as 4,4'-dihydroxydiphenyl and the like, dihydroxydiarylfluorenes such as 9,9-bis(4-hydroxyphenyl)fluorene; 9,9-bis(4-hydroxy-3-methylphenyl)fluorene and the like, bis(4-hydroxyphenyl)diphenylmethane, dihydroxydiaryladamantanes such as 1,3-bis(4-hydroxyphenyl)adamantane; 2,2-bis(4-hydroxyphenyl)adamantane; 1,3-bis(4-hydroxyphenyl)-5,7-dimethyladamantane and the like, bis(4-hydroxyphenyl)diphenylmethane, 4,4'-[1,3-phenylenebis(1-methylethylidene)]bisphenol, 10,10-bis(4-hydroxyphenyl)-9-anthrone, 1,5-bis(4-hydroxyphenylthio)-2,3-dioxapentaene, α,ω-bishydroxyphenylpolydimethylsiloxane compounds, and the like.

These dihydric phenols can be used each alone or as a mixture of two or more kinds.

As the carbonate ester compounds are listed diarylcarbonates such as diphenylcarbonate, dialkylcarbonates such as dimethylcarbonate, diethylcarbonate, and the like.

As the molecular weight modifier can be used any kinds of modifiers that are usually used for polycarbonate polymerization.

Specific examples of monovalent phenols include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, monoalkyl phenols having a linear or branched chain alkyl group with an average carbon atom number of 12 to 35 carbon atoms at ortho-, meta-, or para-position; 9-(4-hydroxyphenyl)-9-(4-methoxyphenyl)fluorene; 9-(4-hydroxy-3-methylphenyl)-9-(4-methoxy-3-methylphenyl)fluorene; 4-(1-adamantyl)phenol, and the like.

Of these monovalent phenols, p-t-butylphenol, p-cumylphenol, p-phenylphenol and the like are used preferably.

In addition, as the branching agent, specific examples include compounds having 3 or more functional groups such as 1,1,1-tris(4-hydroxyphenyl)ethane; 4,4'-[1-[4-[1-(4-hydroxyphenyl)-1-methylethyl]phenyl]ethylidene]bisphenol; α,α',α"-tris(4-hydroxyphenyl)-1,3,5-triisopropylbenzene; 1-[α-methyl-α-(4'-hydroxyphenyl)ethy]-4-[α', α'-bis(4"-hydroxyphenyl)ethyl]benzene; phloroglycine, trimellitic acid, isatinbis(o-cresol), and the like.

The polycarbonate type resin used in the present invention generally has a viscosity average molecular weight preferably of 10,000 to 100,000, more preferably of 15,000 to 40,000.

As the arylphosphine used for the component (B) in the present invention is listed for example an arylphosphine compound having the general formula (1):

P—(X)$_3$          (1)

(wherein, X is hydrocarbon group, at least one of them is an optionally substituted aryl group having 6 to 18 carbon atoms.)

Specific examples of the arylphosphine compounds of the general formula (1) include triphenylphosphine, diphenylbutylphosphine, diphenyloctadecylphosphine, tris-(p-tolyl)phosphine, tris-(p-nonylphenyl)phosphine, tris-(naphthyl)phosphine, diphenyl(hydroxymethyl)phosphine, diphenyl(acetoxymethyl)phosphine, diphenyl-(β-ethylcarboxyethyl)phosphine, tris-(p-chlorophenyl)phosphine, tris-(p-fluorophenyl)phosphine, diphenylbenzylphosphine, diphenyl-β-cyanoethylphosphine, diphenyl-(p-hydroxyphenyl)phosphine, diphenyl-1,4-dihydroxyphenyl-2-phosphine, phenylnaphthylbenzylphosphine, and the like.

Of these compounds, particularly triphenylphosphine is used preferably.

These arylphosphine compounds can be used each alone or in a combination of two or more kinds.

The amount of the above-mentioned component (B) of arylphosphine blended in the resin composition is, 0.001 to 0.1 part by mass, preferably 0.005 to 0.02 part by mass, more preferably 0.008 to 0.015 part by mass per 100 parts by mass of the polycarbonate type resin (A).

When the blending amount is 0.001 part by mass or more, the initial yellowing index (YI-value) increases and good resistance against heating in oven (high temperature aging resistance) is obtained.

Further, when the blending amount is 0.1 part by mass or less, the steam resistance of the resin composition increases.

The alicyclic epoxy compounds for the component (C) used in the present invention means a cyclic aliphatic compound having an alicyclic epoxy group, that is, an epoxy group wherein one oxygen atom is added to the ethylene bonding involved in an aliphatic ring, and specifically, the compounds of the following formula (2) to (11) are used preferably.

[formula 1]

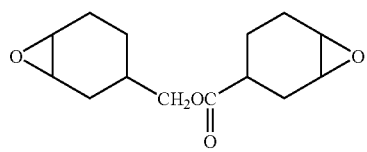

(2)

[formula 2]

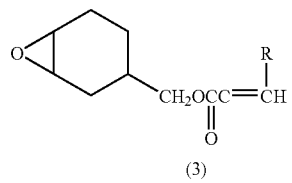

(3)
wherein R is H or CH$_3$.

[formula 3]

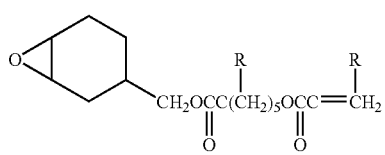

(4)
wherein R is H or CH$_3$.

[formula 4]

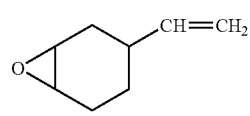

(5)

[formula 5]

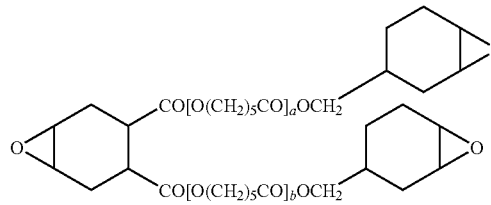

(6)
wherein a + b = 1 or 2.

[formula 6]

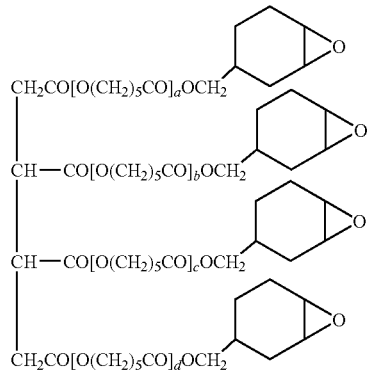

(7)
wherein a + b + c + d = 1 to 3.

-continued

[formula 7]

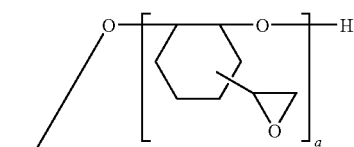

(8)
wherein a + b + c + d = n (integer), R is hydrocarbon group.

[formula 8]

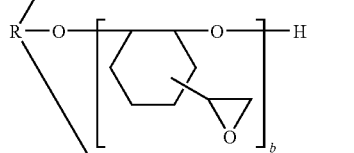

(9)
wherein n is integer, and R is hydrocarbon group.

[formula 9]

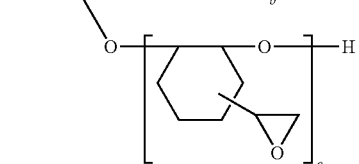

(10)
wherein R is hydrocarbon group.

[formula 10]

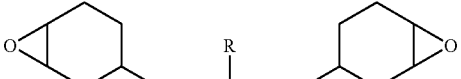

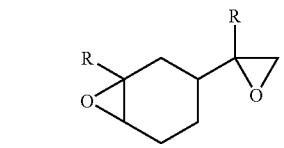

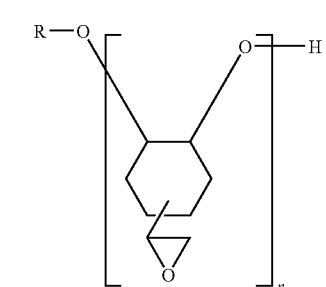

(11)
wherein n is integer,
and R is hydrocarbon group.

Of these compounds, the compound represented by formula (2), (7), or (11) is preferably used, because the compound has excellent compatibility with polycarbonate type resin and does not damage transparency.

By blending the component (C) of alicyclic epoxy compound, the transparency of the resin composition of the present invention increases further and the resistance against hydrolysis also increases.

The amount of the above-mentioned component (C) of alicyclic epoxy compound blended in the resin composition is, 0.01 to 1.0 part by mass, preferably 0.02 to 0.2 part by mass per 100 part by mass of polycarbonate type resin (A).

When the blending amount is 0.01 part by mass or more, transparency and resistance against hydrolysis increase.

Further, when the blending amount is 1.0 part by mass or less, no phase separation occurs and good transparency is also obtained.

The acrylic type resin of the component (D) used in the present invention used as needed means a polymer having, as a repeating unit, the monomer unit of acrylic acid, acrylate, or acrylonitrile and its derivatives, including a homopolymer or a copolymer with styrene, butadiene, and the like.

Specific examples include polyacrylic acid, polymethylmethacrylate (PMMA), polyacrylonitrile, ethylacrylate/2-chloroethylacrylate copolymer, n-butylacrylate/acrylonitrile copolymer, acrylonitrile/styrene copolymer, acrylonitrile/butadiene copolymer, acrylonitrile/butadiene/styrene copolymer, and the like.

Of these polymers or copolymers, particularly polymethylmethacrylate (PMMA) is preferably used.

For polymethylmethacrylate (PMMA), there is no limitation in particular, but usually the PMMA produced by bulk polymerization of methylmethacrylate monomer in the presence of an initiator of peroxide or azo compound is preferred.

The acrylic type resin of the component (D) has a viscosity average molecular weight of preferably 200 to 100,000, more preferably 20,000 to 60,000.

When the viscosity average molecular weight is in the range of 200 to 100,000, phase separation between polycarbonate type resin and acrylic type resin does not develop during molding, so that sufficient transparency is obtained.

The viscosity average molecular weight was evaluated by measuring a limiting viscosity [η] of a chloroform solution at 25° C. with an Ostwald viscometer, and calculating an average polymerization degree PA by the following equation:

$$\log PA = 1.613 \log([\eta] \times 10^4 / 8.29)$$

The above mentioned blending amount of the component (D) of acrylic type resin is, 0.01 to 1.0 part by mass, preferably 0.05 to 0.5 part by mass, more preferably 0.1 to 0.1 part by mass per 100 parts by mass of polycarbonate type resin (A).

When the blending amount is in the range of 0.01 to 1.0 part by mass, transparency is increased.

The polysiloxane compound of the component (E) used in the present invention as needed has at least one kind of group selected from alkoxy, vinyl and phenyl group. Examples of the polysiloxane compound include a reactive silicone compound (organosiloxane and the like) obtained by incorporating at least one group selected from methoxy, vinyl and phenyl group into a silicone compound.

The above-described component (E) is blended as a stabilizer for polycarbonate type resin in order to prevent yellowing caused by heat degradation on molding, defective appearance such as silver streak, or bubble entraining.

The blending amount of the component (E) is generally 0.01 to 3.0 parts by mass, preferably 0.05 to 2.0 parts by mass per 100 parts by mass of polycarbonate type resin (A).

When the blending amount is 0.01 part by mass or more, the above-mentioned blending effects are brought out sufficiently.

Further, when the blending amount is 3.0 parts by mass or less, no clouding is developed in the molded articles of the resin composition.

As the lubricant of the component (F) used in the present invention is listed a compound selected from aliphatic hydrocarbon, polyolefin wax, higher carboxylic acid, higher carboxylic acid metal salt, aliphatic acid amide, aliphatic acid ester, higher alcohol, and the like.

The lubricant may be contained originally in the source material of resin in some cases, or may be blended in the resin composition as a processing aid when the resin composition is produced, a dispersant or spreading agent for a coloring agent when the resin composition is colored, or a mold-releasing agent or surface duplication improver which is used to improve releasing of a molded article of the resin composition from molds during molding.

In the above-mentioned lubricant of the component (F), the aliphatic hydrocarbon is an aliphatic hydrocarbon compound having 5 to 100 carbon atoms, which includes, for example, ligroin, paraffin oil, mineral oil, liquid paraffin, and the like.

The polyolefin wax is a low molecular weight polyolefin having olefin as a basic structure unit and a weight average molecular weight of 500 to 10,000, which includes, for example, paraffin wax, polyethylene wax, polypropylene wax, ethylene/vinyl acetate copolymer wax, polyolefin ionomer wax, and the like.

The higher carboxylic acid is a saturated or unsaturated aliphatic acid having 5 to 50 carbon atoms and includes, for example, stearic acid, valeric acid, caproic acid, capric acid, lauric acid, myristic acid, palmitic acid, arachidic acid, behenic acid, lignoceric acid, cerotic acid, melissic acid, tetratriacontanoic acid, glutaric acid, adipic acid, azelaic acid, naphthenic acid, rosinic acid, oleic acid, linoleic acid, linolenic acid, and the like.

The higher carboxylic acid metal salt is a metal salt of the above-mentioned higher carboxylic acid, including, for example, alkali metal salt of stearic acid, calcium stearate, zinc stearate, magnesium stearate, lead stearate, and the like.

The aliphatic acid amide is a compound having 12 to 150 carbon atoms and one or more acid-amide bonding in the molecule, including, for example, stearamide, oleamide, erucamide, ethylenebisstearamide, methylenebisstearamide, ethylenebisoleamide, and the like.

The aliphatic acid ester is a compound having 10 to 200 carbon atoms and one or more ester bonding in the molecule, including, for example, an ester of higher carboxylic acid and monohydric alcohol such as butylstearate, or an ester of higher carboxylic acid and polyol such as ethyleneglycol monostearate, glycerin monostearate, trimethylolpropane monostearate, pentaerythritol monostearate, pentaerythritol monolaurate, pentaerythritol distearate, glycerin dilaurate, glycerin tristearate, trimethylolpropane distearate, glycerin distearate, glycerin tribehenate, pentaerythritol tristearate, trimethylolpropane tricaprate, trimethylolpropane dioleate, pentaerythritol tetrastearate and the like.

The higher alcohol is a compound having 5 to 50 carbon atoms and one or more hydroxyl groups in the molecule, including, for example, stearyl alcohol.

As the lubricant, the above-mentioned aliphatic acid ester type substance is preferably used without damaging transparency and hydrolysis resistance.

In the present invention, when the total amount of the component (F) of lubricant contained in the polycarbonate type resin composition is 1 part by mass or less, preferably 0.02 to 0.7 part by mass, more preferably 0.03 to 0.6 part by mass, particularly preferably 0.03 to 0.5 part by mass, a high-level of moldability can be attained even in the case where surface duplication and releasing properties are required in the molding process.

When the total amount of lubricant is less than 0.01 part by mass, surface duplication may not be improved.

Further, by the addition of lubricant up to 1 part by mass, a good mold releasing properties can be obtained, but when the lubricant is added in an amount of 1 part by mass or more, it works as a volatile gas on molding and may damage surface duplication.

The amount of the component (F) of lubricant contained in the flame resistant resin composition of the present invention can be quantitatively determined by separating or extracting the lubricant component (F) from the resin composition with a combination of good/poor solvents, by combining analytical methods such as proton NMR technique, gas chromatography/mass spectroscopy (GC/MS technique), liquid chromatography/mass spectroscopy (LC/MS technique) and the like.

The resin composition of the present invention may further contain various kinds of additives as needed in addition to the above-mentioned each component, so long as the effectiveness of the present invention is not impaired.

Examples of the additives include antioxidants such as hindered phenols, esters and the like, UV absorbers such as benzotriazoles, benzophenones and the like, light stabilizers such as hindered amines and the like, ordinary flame retardants, flame-retardant auxiliary agents, mold releasing agents, antistatic agents, coloring agents and the like.

Above-mentioned each component can be mixed or kneaded with an ordinary method without any limitation.

For example, ribbon blender, Henschel mixer, banbury mixer, drum tumbler, single-screw extruder, twin-screw extruder, cokneader, multi-screw extruder, or the like may be employed.

On mixing or kneading, the suitable heating temperature is generally 280 to 320° C.

The polycarbonate type resin composition of the present invention can be molded into an optical part.

Examples of the optical part include optical lens, optical element such as optical waveguide (light guiding body), street lamp cover, glass substitute such as laminate glass for vehicles or buildings.

A representative example of the optical part for vehicles is a lens of optical semiconductor device mounted on vehicles, which has recently made a remarkable progress.

The lens of optical semiconductor device mounted on vehicles is fabricated from the resin composition of the present invention, preferably by injection or extrusion molding.

The lens of optical semiconductor device mounted on vehicles is injection-molded preferably at a cylinder temperature of 260 to 320° C. and a mold temperature of 50 to 120° C.

Further, when precision surface processing such as prism transcription is applied to the lens surface, the lens is molded preferably at a molding temperature of 300° C. and a mold temperature of 100 to 120° C.

The above-mentioned lens of optical semiconductor device mounted on vehicles can be molded into a lens of any form including diverging, converging, Fresnel, or prism form without any limitation, by taking directional and light-collecting properties into consideration.

The lens can be formed, appropriately in accordance with its end and use, in any form of square panel, cylindrical, or curved face providing a lens effect. For example, the lens can have a cross-section of a converging lens form.

Further, in order to enhance light-collecting properties, the lens can have a structure where a Fresnel lens or a prism is placed on the surface of the lens.

To the contrary, in order to reduce directional properties of the lens of an optical semiconductor device mounted on vehicles and to obtain light-diff-using properties, a resin composition obtained by blending a light-diffusing agent to the resin composition of the present invention can be used as a source material for the lens of the optical semiconductor device mounted on vehicles.

The above-mentioned light-diffusing agent is required only to have a refraction index that is different by 0.001 or more compared to that of the polycarbonate type resin used for the resin composition of the present invention. For an ordinary polycarbonate resin for example, beads, powders, fine particles etc. having an average particle diameter of 1 to 50 μm such as cross-linked polymethylmethacrylate (PMMA) resin, silica, silicone resin and the like may be used.

The mixing amount of the light-diffusion agent, which depends on light-diffusion properties requested, is preferably 0.01 to 10 parts by mass per 100 parts by mass of the resin composition of the invention.

A sufficient light-diffusion properties can be obtained at a mixing amount of 0.01 part by mass or more. At a mixing amount of 10 parts by mass or less, good light transmission is obtained and good brightness is obtained for the optical semiconductor device.

A light-scattering layer can be formed on the above-mentioned lens of optical semiconductor device mounted on vehicles in such a manner that the layer covers all or part of the surface of the lens.

EXAMPLES

The present invention will be further described in detail with reference to the following examples, but it should be construed that the invention is in no way limited to those examples.

(1) The materials used in examples and comparative examples are as follows:

(A) Polycarbonate Type Resin

Polycarbonate 1: TARFLON FN1700A (trade name, manufactured by IDEMITSU PETROCHEMICAL CO., LTD., viscosity average molecular weight=18,000).

Polycarbonate 2 to 6: Polycarbonate resins produced in the following Preparation Example 1 to 5.

Viscosity average molecular weight (Mv) was obtained by measuring the limiting viscosity [η] of a methylene chloride solution at 20° C. with an Ubbelohde viscometer, and calculating by the following equation:

$$[\eta]=1.23\times 10^{-5} Mv^{0.83}$$

Preparation Example 1

Polycarbonate 2

An aqueous NaOH solution of bisphenol A (BPA) at a flow rate of 40 L/hr, a methylene chloride at a flow rate of 15 L/hr, and phosgene at a flow rate of 4.0 kg/hr were passed continuously through a tubular reactor having an inner diameter of 6 mm and a length of 30 m.

The tube reactor had a jacket, through which cooling water was passed to keep the reaction temperature below 40° C.

The reaction solution flown out of the tube reactor was introduced continuously into a tank reactor that had an inside volume of 40 L equipped with sweepback wings and baffles. To the tank reactor, were further added an aqueous NaOH solution of BPA at a flow rate of 2.8 L/hr, an aqueous 25% by mass NaOH solution at a flow rate of 0.07 L/hr, water at a flow rate of 17 L/hr, and an aqueous 1% by mass triethylamine solution at a flow rate of 0.64 L/hr.

The reaction solution overflowing out of the tank reactor was continuously taken out and left still, so that the resultant aqueous phase was separated, removed and the resultant methylene chloride phase was collected.

The polycarbonate oligomer thus obtained had a concentration of 325 g/L and a chloroformate group concentration of 0.71 mol/L.

To a 50 L tank reactor equipped with baffles, a paddle-type propeller agitator and a cooling jacket, were charged 15.0 L of the above-described oligomer solution, 9.4 L of methylene chloride, 141 g of p-tert-butylphenol and 1.5 mL of triethylamine. Here, an aqueous NaOH solution of 9,9-bis(4-hydroxy-3-methylphenyl)fluorene (BCFL) (which was prepared by dissolving 639 g of NaOH in 10.8 L of water and then dissolving 1812 g of BCFL) was added, and the resulting reaction mixture was then reacted for 1 hour.

After adding 12.0 L of methylene chloride to dilute the reaction solution, the diluted reaction solution was left still to separate it into an organic phase containing polycarbonate and an aqueous phase containing excess NaoH, and then the organic phase was separated.

The resultant methylene chloride solution containing polycarbonate was washed with 10 L of an aqueous 0.03 mol/L NaOH solution, further washed with 10L of 0.2 mol/L hydrochloric acid, then washed repeatedly with pure water until the electrical conductivity in the aqueous phase decreased to 0.01 µs/m or less after washing.

The obtained methylene chloride solution containing polycarbonate was concentrated and the resultant solid was pulverized into powder, which was then dried at 120° C. under reduced pressure.

The properties of the resultant polycarbonate 2 were as follows:

Mv=17,500;

Monomer ratio obtained by NMR [mol %], BPA:BCFL=81:19;

Tg=168° C.

Preparation Example 2

Polycarbonate 3

To a 50 L tank reactor equipped with baffles, a paddle-type propeller agitator and a cooling jacket, were charged 15.0 L of the oligomer solution obtained in Preparation Example 1, 9.4 L of methylene chloride and 8.9 mL of triethylamine. Here, 70 g of α,ω-bis(2-hydroxyphenylpropyl)polydimethylsiloxane of "X-22-1821" [trade name, manufactured by SHIN-ETSU CHEMICAL CO., LTD., dimethylsiloxane polymerization degree (n)=43] was added, and the resultant reaction mixture was then reacted for 10 minutes.

Further, 141 g of p-tert-butylphenol and an aqueous NaOH solution of BPA (prepared by dissolving 554 g of NaOH in 9.3 L of water and then dissolving 1093 g of BPA) were added to the reaction mixture, which was then reacted for 40 minutes.

After adding 12.0 L of methylene chloride to dilute the reaction solution, the diluted reaction solution was left still to separate it into an organic phase containing polycarbonate and an aqueous phase containing excess NaOH, and then the organic phase was separated.

The resultant methylene chloride solution containing polycarbonate was washed with 10 L of an aqueous 0.03 mol/L NaOH solution, further washed with 10 L of 0.2 mol/L hydrochloric acid, then washed repeatedly with pure water until the electrical conductivity of the aqueous phase decreased to 0.01 µs/m or less after washing.

The obtained methylene chloride solution containing polycarbonate was concentrated and the resultant solid was pulverized into powder, which was then dried at 120° C. under reduced pressure.

The properties of the resultant polycarbonate 3 were as follows:

Mv=17,600;

Amount of dimethylsiloxane obtained by NMR [% by mass]=1.0;

Tg=148° C.

Preparation Example 3

Polycarbonate 4

Polycarbonate 4 was obtained in the same manner as in Preparation Example 1, except that an aqueous NaOH solution of 1,1-bis(4-hydroxyphenyl)cyclohexane (BPZ) (prepared by dissolving 639 g of NaOH in 10.8 L of water and then dissolving 1427 g of BPZ) was used in place of the aqueous NaOH solution of BCFL.

The properties of the resultant polycarbonate 4 were as follows:

Mv=17,500;

Monomer ratio obtained by NMR [mol %], BPA:BPZ=81:19;

Tg=155° C.

Preparation Example 4

Polycarbonate 5

Polycarbonate 5 was obtained in the same manner as in Preparation Example 1, except that the amount of the oligomer solution was changed from 15.0 L to 5.0 L, the amount of methylene chloride was changed from 9.4 L to 3.1 L, the amount of p-tert-butylphenol was changed from 141 g to 47.0 g, the amount of triethylamine was changed to 0.5 mL, and an aqueous potassium hydroxide solution of 2,2-bis(4-hydroxyphenyl)adamantane (BPAD) (prepared by dissolving 298 g of KOH in 5.0 L of water and dissolving 511 g of BPAD) was used in place of the aqueous NaOH solution of BCFL.

The properties of the resultant polycarbonate 5 were as follows:

Mv=17,700;

Monomer ratio obtained by NMR [mol %], BPA:BPAD=81:19;

Tg=178° C.

Preparation Example 5

Polycarbonate 6

Polycarbonate 6 was obtained in the same manner as in Preparation Example 1, except that 342 g of 9-(4-hydroxyphenyl)-9-(4-methoxyphenyl)fluorene was used in place of 141 g of p-tert-butylphenol and that an aqueous NaOH solution of BPA (prepared by dissolving 639 g of NaOH in 10.8 L of water and then dissolving 1093 g of BPA) was used in place of the aqueous NaOH solution of BCFL.

The properties of the resultant polycarbonate 6 were as follows:
Mv=17,700;
Tg=157° C.
(B) Arylphosphine
Triphenylphosphine: JC-263 (trade name, manufactured by JOHOKU CHEMICAL CO., LTD.).
(C) Alicyclic Epoxy Compound
CELLOXIDE2021P (trade name, manufactured by DAICEL CHEMICAL INDUSTRIES, LTD., represented by formula (2)).
(D) Acrylic Type Resin
Polymethylmethacrylate (PMMA): DIANAL BR83 (trade name, manufactured by MITSUBISHI RAYON CO., LTD., viscosity average molecular weight=40,000).
The viscosity average molecular weight was evaluated by measuring a limiting viscosity [η] of a chloroform solution at 25° C. with Ostwald viscometer, and calculating an average polymerization degree PA by the following equation:

$$\log PA = 1.613 \log([\eta] \times 10^4/8.29)$$

(E) Polysiloxane Compound Having Alkoxy, Vinyl, or Phenyl Group
KR511 (trade name, manufactured by SHINETSU SILICONE CO., LTD., organosiloxane having phenyl, methoxy, and vinyl groups).
(F) Lubricant
Stearic acid monoglyceride: "S100A" (trade name, manufactured by RIKEN VITAMIN CO., LTD.). (2) The methods used for measuring each evaluation item are as follows:
Transparency: total light transmission was evaluated in accordance with JIS-K-7105. The transparency was measured using DIGITAL HAZE COMPUTER Model HGM-2DP manufactured by SUGA TEST INSTRUMENTS CO., LTD.
Yellowing Index: YI-value was evaluated in accordance with JIS-K-7105. It was measured using a reflective spectrophotometer of MACBETH CORP. MS2020 PLUS (D light-source; reflection at a viewing angle of 10 degree).
Thermal Deformation Temperature: evaluated in accordance with JIS-K-7207.
Steam Resistance: a molded test piece described below was put in a tank of a steam-resistance testing machine (manufactured by HIRAYAMA MANUFACTURING CORPORATION) and exposed to an atmosphere of saturated steam at 127° C. for 100 hours, then the total light transmission of the molded test piece was measured and haze (clouding or craze was developed or not) and change in appearance of the molded test piece were inspected by visual observation.
The test results were evaluated in a three-grade rating: Ex (excellent), Do (good), and X (poor).
Heat Resistance in Oven (High Temperature Aging Resistance): a molded test piece was kept in a gear oven (circulating hot-air dryer) at 140° C. for 200 hours, then the total light transmission and YI-value (yellowing index) of the molded test piece were measured.
Izod Impact Strength (Notch): evaluated in accordance with ASTM D256.

Examples 1 to 9 and Comparative Examples 1 to 7

Each component was mixed in a ratio given in Tables 1 and 2, and then they were kneaded with an extruder at 280° C. into pellets.
The pellets were molded with an injection-molding machine at a molding temperature of 300° C. and a mold temperature of 100° C. to obtain a molded test piece (14 cm square plate with a thickness of 4 mm), which was subjected to each evaluation test.
Herein, in Comparative Examples 6 and 7, phosphate compound 1 (trade name: IRGAFOS168, manufactured by CIBA-GEIGY CORP.) and phosphate compound 2 (trade name: ADK STAB PEP-36, manufactured by ASAHI DENKA CO., LTD.), respectively, were used as an antioxidant in place of the component (B) of arylphosphine.
The evaluation results are given in Tables 1 and 2.
In Comparative Examples 1 and 2, cyclic olefin resin 1 (trade name: ARTON F5032, manufactured by JSR CORPORATION) or cyclic olefin resin 2 (trade name: ZEONOR1600, manufactured by ZEON CORPORATION) was used in place of polycarbonate type resin. Each component was mixed in a ratio given in Tables 1 and 2, and the mixture was kneaded with an extruder at 280° C., and then pelletized.
The resultant pellets were molded with an injection-molding machine at a molding temperature of 280° C. and a mold temperature of 80° C. to obtain a molded test piece (30×20 mm rectangular plate with a thickness of 3 mm), which was subjected to each evaluation test.

TABLE 1

| | | Example | | | | | | | | |
|---|---|---|---|---|---|---|---|---|---|---|
| | Components | 1 | 2 | 3 | 4 | 5 | 6 | 7 | 8 | 9 |
| (A) | Polycarbonate 1 | 100 | 100 | 100 | 50 | — | — | 70 | — | — |
| | Polycarbonate 2 | — | — | — | 50 | — | — | — | — | — |
| | Polycarbonate 3 | — | — | — | — | 100 | — | — | — | — |
| | Polycarbonate 4 | — | — | — | — | — | 100 | — | — | — |
| | Polycarbonate 5 | — | — | — | — | — | — | 30 | — | — |
| | Polycarbonate 6 | — | — | — | — | — | — | — | 100 | 100 |
| (B) | Arylphosphine | 0.01 | 0.01 | 0.01 | 0.01 | 0.01 | 0.01 | 0.01 | 0.01 | 0.01 |
| (C) | Alicyclic epoxy compound | 0.01 | 0.01 | 0.01 | 0.01 | 0.01 | 0.01 | 0.01 | 0.01 | 0.01 |
| (D) | Acrylic type resin | — | — | 0.1 | 0.1 | 0.1 | 0.1 | 0.1 | 0.1 | 0.1 |
| (E) | Polysiloxane compound | — | 0.1 | 0.1 | 0.1 | 0.1 | 0.1 | 0.1 | 0.1 | 0.1 |
| | Phosphate compound 1 | — | — | — | — | — | — | — | — | — |
| | Phosphate compound 2 | — | — | — | — | — | — | — | — | — |

TABLE 1-continued

| | Components | Example 1 | 2 | 3 | 4 | 5 | 6 | 7 | 8 | 9 |
|---|---|---|---|---|---|---|---|---|---|---|
| | Cyclic olefin resin 1 | — | — | — | — | — | — | — | — | — |
| | Cyclic olefin resin 2 | — | — | — | — | — | — | — | — | — |
| (F) | Lubricant | — | — | — | — | — | — | — | — | 0.03 |
| Initial properties | Total light transmission (%) | 91.2 | 91.3 | 91.4 | 91.3 | 91.1 | 91.2 | 91.3 | 91.3 | 91.3 |
| | Yellowing index (YI) | 8.5 | 8.6 | 8.6 | 8.7 | 8.6 | 8.6 | 8.6 | 8.7 | 8.6 |
| | Izod impact strength (KJ/m$^2$) | 60 | 60 | 60 | 43 | 65 | 40 | 40 | 60 | 60 |
| | Appearance | transparent | transparent | transparent | transparent | transparent | transparent | transparent | transparent | transparent |
| After steam resistance test | Total light transmission (%) | 91.1 | 91.2 | 91.3 | 91.2 | 91.1 | 91.1 | 91.2 | 91.2 | 91.3 |
| | Izod impact strength (KJ/m$^2$) | 55 | 55 | 55 | 40 | 60 | 35 | 39 | 55 | 55 |
| | Appearance | micro-craze | micro-craze | micro-craze | micro-craze | micro-craze | micro-craze | micro-craze | micro-craze | micro-craze |
| After high temperature aging test | Total light transmission (%) | 91.0 | 90.8 | 90.9 | 90.8 | 90.9 | 90.8 | 90.9 | 90.8 | 90.7 |
| | Yellowing index (YI) | 9.0 | 8.9 | 8.8 | 9.0 | 8.8 | 8.9 | 8.9 | 9.0 | 8.9 |
| | Izod impact strength (KJ/m$^2$) | 60 | 60 | 60 | 43 | 60 | 35 | 40 | 60 | 60 |
| | Appearance | transparent | transparent | transparent | transparent | transparent | transparent | transparent | transparent | transparent |

TABLE 2

| | Components | Comparative Example 1 | 2 | 3 | 4 | 5 | 6 | 7 |
|---|---|---|---|---|---|---|---|---|
| (A) | Polycarbonate 1 | — | — | 100 | 100 | 100 | 100 | 100 |
| | Polycarbonate 2 | — | — | — | — | — | — | — |
| | Polycarbonate 3 | — | — | — | — | — | — | — |
| | Polycarbonate 4 | — | — | — | — | — | — | — |
| | Polycarbonate 5 | — | — | — | — | — | — | — |
| | Polycarbonate 6 | — | — | — | — | — | — | — |
| (B) | Arylphosphine | — | — | — | 0.01 | 0.15 | — | — |
| (C) | Alicyclic epoxy compound | — | — | — | — | 0.01 | 0.01 | 0.01 |
| (D) | Acrylic type resin | — | — | — | — | — | 0.1 | 0.1 |
| (E) | Polysiloxane compound | — | — | — | — | — | 0.1 | 0.1 |
| | Phosphate compound 1 | — | — | — | — | — | 0.01 | — |
| | Phosphate compound 2 | — | — | — | — | — | — | 0.01 |
| | Cyclic olefin resin 1 | 100 | — | — | — | — | — | — |
| | Cyclic olefin resin 2 | — | 100 | — | — | — | — | — |
| Initial properties | Total light transmission (%) | 92.7 | 92.5 | 90.0 | 91.0 | 91.5 | 91.8 | 91.5 |
| | Yellowing index (YI) | 8.0 | 8.0 | 9.5 | 9.0 | 8.2 | 8.5 | 8.2 |
| | Izod impact strength (KJ/m$^2$) | 1 | 2 | 60 | 60 | 60 | 60 | 60 |
| | Appearance | transparent | transparent | transparent | transparent | transparent | transparent | transparent |
| After steam resistance test | Total light transmission (%) | 92.5 | 85.7 | 89.8 | 89.5 | 80.4 | 88.5 | 72.4 |
| | Izod impact strength (KJ/m$^2$) | 1 | 2 | 60 | 60 | 45 | 40 | 35 |
| | Appearance | clouding | micro-craze | micro-craze | micro-craze | white spots | turbid white | turbid white |
| After high temperature aging test | Total light transmission (%) | 89.8 | 89.4 | 89.9 | 89.9 | 91.3 | 91.4 | 89.8 |
| | Yellowing index (YI) | 28.5 | 24.3 | 9.8 | 9.4 | 8.6 | 8.9 | 10.0 |

TABLE 2-continued

| Components | Comparative Example | | | | | | |
|---|---|---|---|---|---|---|---|
| | 1 | 2 | 3 | 4 | 5 | 6 | 7 |
| Izod impact strength (KJ/m$^2$) | 4 | 6 | 60 | 60 | 60 | 60 | 58 |
| Appearance | yellowing | yellowing | transparent | transparent | transparent | transparent | yellowing |

INDUSTRIAL APPLICABILITY

According to the present invention, by blending a specific antioxidant (triphenylphosphine) and an alicyclic epoxy compound in a given ratio to polycarbonate type resin, there is provided a molding material, which has a high steam resistance and a low time-course change in the total light transmission at high temperature, without sacrificing the heat resistance and impact resistance inherent in the polycarbonate type resin and is suitably used for production of a lens of optical semiconductor device mounted on vehicles and the like that can be used in still severer environment. Also provided is an optical part such as a lens of optical semiconductor device mounted on vehicles (headlight, backlight, taillight and the like, which is produced by molding the above molding material.

The invention claimed is:

1. A polycarbonate resin composition comprising a polycarbonate resin (A), 0.001 to 0.1 part by mass of an arylphosphine (B), 0.01 to 1.0 part by mass of an alicyclic epoxy compound (C), and 0.01 to 1.0 part by mass of an acrylic resin (D) per 100 parts by mass of the component (A).

2. The polycarbonate resin composition according to claim 1 further, comprising 0.01 to 1 part by mass of a polysiloxane compound (E) having at least one group selected from alkoxy, vinyl, and phenyl groups per 100 parts by mass of the component (A).

3. The polycarbonate resin composition according to claim 1, further comprising 0.01 to 1 part by mass of a lubricant (F) per 100 parts by mass of the component (A).

4. The polycarbonate resin composition according to claim 1, wherein the component (A) of polycarbonate type resin has a glass transition temperature of 140° C. or more.

5. The polycarbonate resin composition according to claim 1, wherein the component (B) of arylphosphine is triphenylphosphine.

6. An optical part obtained by molding the polycarbonate resin composition according to claim 1.

7. The polycarbonate resin composition according to claim 1, wherein the arylphosphine (B) is present in an amount of from 0.005 to 0.02 part by mass; the alicyclic epoxy compound (C) is present in an amount of from 0.01 to 0.2 part by mass; and the acrylic resin (D) is present in an amount of 0.05 to 0.5 part by mass.

8. The polycarbonate resin composition according to claim 7, further comprising a polysiloxane compound (E) in an amount of from 0.05 to 1 part by mass.

9. The polycarbonate resin composition according to claim 8, wherein a 14 cm$^2$ square plate having thickness of 4 mm prepared by injection molding the polycarbonate resin composition at a molding temperature of 300° C. and a mold temperature of 100° C. is subjected to a steam resistance test by exposing the square plate to an atmosphere of saturated steam at 127° C. for 100 hours has a total light transmission evaluated in accordance with JIS-K-7105 of at least 91.1%.

10. The polycarbonate resin composition according to claim 9, wherein the total light transmission is from 91.1 to 91.3%.

11. The polycarbonate resin composition of claim 9, wherein the arylphosphine (B) is triphenylphosphine and the alicyclic epoxy compound (C) has the following formula:

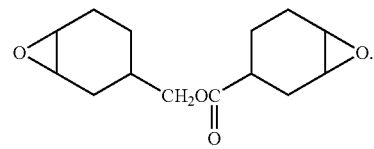

12. The polycarbonate resin composition according to claim 1, wherein the acrylic resin (D) is polymethylmethacrylate, and the polysiloxane compound (E) is an organosiloxane having phenyl, methoxy, and vinyl groups.

13. The polycarbonate resin composition according to claim 1, wherein the acrylic resin (D) has a viscosity average molecular weight of from 40,000 to 60,000.

14. The polycarbonate resin composition according to claim 4, wherein the lubricant (F) is stearic acid monoglyceride.

15. A transparent lamp lens molded from the polycarbonate resin composition according to claim 1.

16. The polycarbonate resin composition according to claim 1, wherein the polycarbonate resin (A) comprises polymerized units of 2,2-bis(4-hydroxyphenyl)propane.

* * * * *